United States Patent
Yoneda et al.

(10) Patent No.: US 9,080,080 B2
(45) Date of Patent: Jul. 14, 2015

(54) METHOD FOR PRODUCING POLISHING LIQUID COMPOSITION

(75) Inventors: Yasuhiro Yoneda, Wakayama (JP); Kanji Sato, Wakayama (JP)

(73) Assignee: KAO CORPORATION, Tokyo (JP)

( * ) Notice: Subject to any disclaimer, the term of this patent is extended or adjusted under 35 U.S.C. 154(b) by 90 days.

(21) Appl. No.: 13/996,976

(22) PCT Filed: Dec. 21, 2011

(86) PCT No.: PCT/JP2011/079666
§ 371 (c)(1),
(2), (4) Date: Jun. 21, 2013

(87) PCT Pub. No.: WO2012/086698
PCT Pub. Date: Jun. 28, 2012

(65) Prior Publication Data
US 2013/0283704 A1    Oct. 31, 2013

(30) Foreign Application Priority Data

Dec. 24, 2010 (JP) ................................ 2010-287774

(51) Int. Cl.
*C09G 1/00* (2006.01)
*C09G 1/02* (2006.01)
*C09K 3/14* (2006.01)
*G11B 5/84* (2006.01)
*B01D 39/00* (2006.01)

(52) U.S. Cl.
CPC .............. *C09G 1/02* (2013.01); *C09K 3/1463* (2013.01); *G11B 5/8404* (2013.01)

(58) Field of Classification Search
CPC .......... C09G 1/00; B01D 24/10; B01D 24/02; B01D 39/00
USPC .............................. 51/308; 210/777, 348, 263
See application file for complete search history.

(56) References Cited

U.S. PATENT DOCUMENTS

| | | | |
|---|---|---|---|
| 3,352,424 A | 11/1967 | Guebert et al. | |
| 4,007,113 A | 2/1977 | Ostreicher | |
| 4,007,114 A | 2/1977 | Ostreicher | |
| 2003/0217963 A1* | 11/2003 | Mitchell et al. | ............... 210/435 |
| 2006/0030243 A1 | 2/2006 | Nishimoto et al. | |

FOREIGN PATENT DOCUMENTS

| | | |
|---|---|---|
| JP | 50-15162 | 2/1975 |
| JP | 11-165006 A | 6/1999 |
| JP | 2003-19078 A | 7/2003 |
| JP | 2003-190780 A | 7/2003 |
| JP | 2006-75975 A | 3/2006 |
| JP | 2006-136996 A | 6/2006 |
| JP | 2007-99586 A | 4/2007 |
| JP | 2010-95568 A | 4/2010 |
| WO | WO 2012/039428 A1 | 3/2012 |

OTHER PUBLICATIONS

International Search Report for PCT/JP2011/079666 dated Jan. 31, 2012.
Chinese Office Action for corresponding Chinese Application No. 201180062469.2 dated Feb. 24, 2014 (with English translation).

* cited by examiner

*Primary Examiner* — Pegah Parvini
(74) *Attorney, Agent, or Firm* — Birch, Stewart, Kolasch & Birch, LLP

(57) ABSTRACT

Provided is a method for producing a polishing composition capable of reducing scratches and particles of an object to be polished, after polishing. It is a method for producing a polishing composition including a step of filtering with a filtration filter a silica particle dispersion containing colloidal silica whose primary particles have an average particle diameter in a range of 1 to 100 nm, wherein the filtration filter includes diatomite cationized by use of a polyvalent amine compound having 9 to 200 cationic groups in the molecule.

12 Claims, No Drawings

METHOD FOR PRODUCING POLISHING LIQUID COMPOSITION

TECHNICAL FIELD

The present invention relates to a method for producing a polishing composition, and a polishing composition produced by the production method.

BACKGROUND ART

In recent years, there is a demand for high capacity and reduction in a diameter in memory hard disk drives, and in order to increase recording density, there is a request that a unit recording area be reduced by decreasing a floating amount of a magnetic head. Along with this, requirement for surface quality after polishing is becoming strict year after year also in the step of producing a magnetic disk substrate. That is, it is necessary to reduce surface roughness, micro waviness, roll-off, and protrusions in accordance with reduction in a flying height of a head, and the allowable number of scratches per substrate surface and the allowable size and depth thereof are decreasing along with the reduction in a unit recording area.

Further, integration and speed are increasing also in a semiconductor field, and particularly in high integration, there is a demand that wiring be finer. Consequently, in a method for producing a semiconductor substrate, depth of focus becomes small at a time of exposing a photoresist to light, and hence, further surface smoothness is desired.

In order to reduce scratches formed on a surface of an object for the purpose of improving surface smoothness in response to the above-mentioned request, there has been proposed a polishing composition where the number of coarse particles is reduced by centrifugation and multistage filtration (Patent Documents 1 and 2, for example), and a method for producing the polishing composition. Further, there has been proposed a method for producing a polishing silica sol including a step of passing a silica sol through a filter having a positive zeta potential (Patent Document 3 for example).

PRIOR ART DOCUMENTS

Patent Documents

Patent document 1: JP 2006-075975 A
Patent document 2: JP 2006-136996 A
Patent document 3: JP 2010-95568 A

DISCLOSURE OF INVENTION

Problem to be Solved by the Invention

In order to achieve high density such as high capacity and high integration, it is necessary to reduce particles on a substrate surface as well as scratches on the substrate surface. Further, according to a conventional technique, it is required to treat raw materials of an abradant dispersion by centrifugation or by multistage filtration. As a result, the production time becomes long, and the production cost is increased.

In light of such situations, the present invention provides a method for producing a polishing composition that is capable of reducing scratches and particles on a substrate surface after polishing, and furthermore, the present invention provides a method with favorable productivity.

Means for Solving Problem

In an aspect, the present invention relates to a method for producing a polishing composition, and the method includes a step of filtering with a filtration filter a silica particle dispersion containing colloidal silica whose primary particles have an average particle diameter in a range of 1 to 100 nm. And the present invention relates to a method for producing a polishing composition where the filtration filter includes diatomite cationized by use of a polyvalent amine compound having 9 to 200 cationic groups in the molecule.

Further, in another aspect, the present invention relates to a polishing composition that is produced or can be produced by the production method of the present invention.

Further in another aspect, the present invention relates to a filtration filter including diatomite cationized by use of a polyvalent amine compound having 9 to 200 cationic groups in the molecule.

Effects of the Invention

According to the present invention, it is possible to produce a polishing composition capable of reducing scratches and particles on a substrate surface after polishing. Further, according to the present invention, as preferably it is possible to effectively remove coarse particles and sediments in the silica particle dispersion, the time for producing a polishing composition and/or the production cost can be decreased. That is, it enables to enhance the productivity of the polishing liquid composition because of the effective removal of the coarse particles and sediments.

DESCRIPTION OF THE INVENTION

The present invention is based on the knowledge that coarse particles and sediments in a polishing composition cause the problem of particles and scratches on the substrate and that the coarse particles and the sediments in the polishing composition can be removed effectively by filtering with a filter that uses a filter aid of diatomite cationized with a predetermined polyvalent amine compound.

Namely, the present invention as an aspect relates to a method for producing a polishing composition, including a step of filtering with a filtration filter a silica particle dispersion containing colloidal silica whose primary particles have an average particle diameter in a range of 1 to 100 nm, where the filtration filter includes diatomite cationized by use of a polyvalent amine compound having 9 to 200 cationic groups in the molecule.

When the polishing composition produced by the production method of the present invention is used for example in the step of polishing a precision component substrate for high density or high integration, minute scratches and particles can be reduced effectively, and a precision component substrate such as a memory hard disk substrate and a semiconductor element substrate of high quality with excellent surface properties can be produced economically.

Though it has not been clarified yet the reason a polishing composition capable of reducing scratches and particles on a substrate surface after polishing can be produced economically according to the production method of the present invention, in other words, the reason the coarse particles and sediments in the silica particle dispersion used for the polishing composition can be reduced effectively, the reason can be figured as follows. First, the effect of the present invention is expressed in a case where the diatomite is treated with a polyvalent amine compound having a specific cationic group. It cannot be considered that the effect of the present invention results mainly from a statistic interaction that generally is regarded advantageous in removal of aggregates or the like, since the effect does not become uniform even when the surface potential is positive. In that case, the expression of the effect of the present invention cannot be considered as being provided solely by adjustment of the surface potential of the diatomite by use of the polyvalent amine compound (e.g., making the zeta potential positive), but the following mechanism is presumed as functioning. Namely, within a cake layer of the filter containing the diatomite, the coarse particles such as aggregates of silica particles that will form particles and also the sediments are removed by the gaps between the particles formed with diatomite of tens of micrometers and the gaps of submicrons of secondary aggregates, and further by pores of submicrons present in each of the diatomite particles. And in a case where the diatomite is cationized with the polyvalent amine compound having a predetermined number of cationic groups, the polyvalent amine compound is adsorbed onto the diatomite so as to strengthen the interaction with the silica particles. In particular, larger particles such as the aggregates of the silica particles reside within the cake layer while only fine silica particles pass, and thus favorable colloidal silica with fewer sediments and fewer coarse particles such as the aggregates of the silica particles that causes the particle problem is obtained. When the number of the cationic groups of the polyvalent amine compound is larger than the predetermined lower limit, the polyvalent amine used to treat the diatomite is prevented from dropping and mixing with the filter liquid. As a result, it is possible to suppress a phenomenon that the polyvalent amine compound is adsorbed onto the colloidal particles in the filter liquid, and that the interactions between the colloidal particles is strengthened to form newly a secondary aggregate in the filter liquid so as to form the particles. On the other hand, in a case where the number of the cationic groups in the polyvalent amine compound is smaller than the predetermined upper limit, it is possible to suppress a phenomenon that the interaction with the colloidal particles within the cake layer of the diatomite treated with the polyvalent amine compound becomes strong excessively to cause blockage so as to considerably lower the filtration speed. It is presumed also that the silica particle aggregates can be prevented from flowing in one direction from large gaps or the like so as to cause filtration leakage and be mixed with the filtrate and form the particles. It can be presumed that the effect of the present invention is obtained by controlling the interaction between the diatomite and the silica particles, whereby improving the filtration efficiency. However, it should be noted that the present invention is not limited to the presumption.

The term "coarse particle" as used herein refers to a coarse colloidal silica particle having a particle diameter of 0.5 µm or more, and the number of coarse particles in the polishing composition (including a raw polishing composition) can be quantitatively evaluated by using "AccuSizer 780 APS" manufactured by Particle Sizing Systems Inc. as described later in examples or it can be evaluated indirectly on the basis of the quantity of a liquid passing through a 0.45 µm filter. In the present specification, the colloidal silica particles in the polishing composition include not only primary particles but also aggregated particles in which the primary particles flocculate. Further, the term "sediment" as used herein refers to a silica aggregate of 50 to 500 nm, and the amount of sediment can be evaluated indirectly by ΔCV or polishing evaluation described later.

The term "scratch" as used herein refers to a physical property to be important for high density or high integration, particularly, in a memory hard disk substrate or a substrate for a semiconductor element, the scratch being a minute scar on a substrate surface having a depth of 1 nm or more and less than 100 nm, a width of 5 nm or more and less than 500 nm, and a length of 100 µm or more. The scratch can be detected with an optical surface analyzer (OSA6100, produced by KLA-Tencor) described in the examples described later, and can be quantitatively evaluated as the number of scratches. Further, the depth and width of a scratch can be measured with an atomic force microscope (AFM).

The term "particle" as used herein refers to a protrusion on a substrate and can be an obstacle for high density or high integration. The number of particles on the substrate after polishing can be quantitatively evaluated by measurement with the optical surface analyzer (OSA6100, produced by KLA-Tencor) described in the examples described later. By analyzing a particle portion with a scanning electron microscope (SEM), materials of the protrusion (silica, alumina, titanium, an Fe compound (stainless steel)), an organic substance, a nickel compound (NiP polishing waste, nickel hydroxide, etc.)) can be identified. Further, a length and a width of the protrusion can be measured by use of the atomic force microscope (AFM).

[Method for Producing Polishing Composition]

The method for producing a polishing composition according to the present invention (hereinafter described also as "the production method of the present invention") includes a step of filtering a silica particle dispersion (hereinafter described also as "raw silica particle dispersion") containing colloidal silica whose primary particles have an average particle diameter of 1 to 100 nm, with a filtration filter including diatomite cationized by use of a polyvalent amine compound having 9 to 200 cationic groups in the molecule (hereinafter described also as "diatomite-containing filter") (this step is described also as "filtration treatment (1)").

[Filtration Treatment (1)]

The term "filtration treatment (1)" as used herein refers to a filtration treatment including filtration of the raw silica particle dispersion in the production method of the present invention by use of the diatomite-containing filter. The term "diatomite-containing filter" as used herein refers to a filtration filter including diatomite that has been cationized by use of a polyvalent amine compound having 9 to 200 cationic groups in the molecule. Namely, the diatomite-containing filter is a filtration filter including the cationized diatomite as a filter aid. An embodiment of the diatomite-containing filter is a filtration filter produced by using the cationized diatomite. Another embodiment of the diatomite-containing filter is a filtration filter cationized by passing the polyvalent amine compound through a filtration filter including diatomite.

Therefore, in another aspect, the present invention relates to a method of producing a filtration filter including a cationization treatment of the diatomite by using a polyvalent amine compound having 9 to 200 cationic groups in the molecule. The method for producing a filtration filter according to the present invention preferably includes a use of the cationized diatomite as a filter aid. Specifically, it is preferable that the filtration filter is produced by using the cationized diatomite, or the filtration filter is produced by cationization treatment by passing the polyvalent amine compound through a filtration filter including diatomite.

In another aspect, the present invention relates to a filtration filter including, as a filter aid, diatomite that has been cationized by use of a polyvalent amine compound having 9 to 200 cationic groups in the molecule. The cationization treatment can be carried out similarly to the cationization treatment described below.

[Cationization Treatment]

The term "cationization treatment" as used herein refers to a treatment of making the diatomite contact with a polyvalent amine compound having 9 to 200 cationic groups in the molecule so that the polyvalent amine compound is adsorbed onto the diatomite surface thereby cationizing the diatomite. The diatomite cationized by the cationization treatment forms the filter aid in the diatomite-containing filter. As one embodiment of the cationization treatment, before and/or after disposing the diatomite within the filtration filter, the diatomite and the polyvalent amine compound are contacted with each other so as to cationize the diatomite. The term "cationization" as used herein refers that the polyvalent amine compound is adsorbed onto the diatomite surface and the potential becomes higher than the initial potential of the diatomite surface. It does not necessarily indicate to have a positive potential, namely, that the zeta potential exhibits a positive value. The cationization of the diatomite can be checked by measuring the zeta potential of the treated diatomite.

The zeta potential of the cationized diatomite is preferably −10 mV or more, more preferably 0 mV or more, still more preferably 10 mV or more, and still further preferably 15 mV or more, from the viewpoint of reducing scratches and particles, and from the viewpoint of enhancing productivity of a polishing composition. Preferably it is 50 mV or less, more preferably 40 mV or less, still more preferably 30 mV or less and still further preferably 25 mV or less, from the viewpoint of reducing scratches and particles, and from the viewpoint of enhancing productivity of a polishing composition. Therefore, from the viewpoint of reducing scratches and particles and from the viewpoint of enhancing productivity of a polishing composition, the zeta potential is preferably −10 mV to 50 mV, more preferably 0 mV to 40 mV, still more preferably 0 mV to 30 mV, still more preferably 10 mV to 30 mV, and still further preferably 15 mV to 25 mV.

An example of specific method of cationization treatment is a method for obtaining a cationized diatomite by adding diatomite to an aqueous solution of the polyvalent amine compound, stirring and mixing, and then forming a pre-coat layer of the diatomite on a filter medium. In another example of specific method of cationization treatment, the aqueous solution of the polyvalent amine compound is passed through a filtration filter including diatomite while circulating the aqueous solution.

The concentration of the polyvalent amine compound in the aqueous solution during the cationization treatment is preferably 0.05 to 10.0 wt %, more preferably 0.1 to 5.0 wt %, and still more preferably 0.5 to 2.0 wt %, from the viewpoint of making the polyvalent amine compound adsorb efficiently onto the diatomite surface.

In the cationization treatment, the ratio in the amount of the polyvalent amine compound in use to the diatomite (weight ratio) is preferably 1/500 to 1/1, more preferably 1/200 to 1/2, still more preferably 1/100 to 1/3, and still further preferably 1/10 to 1/4 as ('weight of polyvalent amine compound'/'weight of diatomite'), from the viewpoint of efficient adsorption of the polyvalent amine compound onto the diatomite surface, though it depends on the surface area of the diatomite particles.

In an embodiment of the production method according to the present invention, the cationization treatment may be carried out. Namely, the production method of the present invention in one embodiment is a method for producing a polishing composition, comprising: preparing the diatomite-containing filter by the cationization treatment; performing the filtration treatment (1) by use of the diatomite-containing filter; and using the silica particles obtained in the filtration treatment (1).

[Diatomite]

Diatomite to be cationized is made from marine or freshwater diatomeae. From the viewpoint of reducing scratches and particles, marine diatomite is preferred. Various shapes of diatomite can be used, for example, disc-shape, boat-shape, spindle-shape, and rod-shape. From the viewpoint of reducing scratches and particles, it is preferable that the diatomite is pulverized, classified if necessary, and baked at temperature in a range of 650 to 1350° C. From the viewpoint of enhancing productivity (filtration liquid passing speed), it is possible to use diatomite that has been obtained by adding about 5 wt % of a flux such as chloride of alkali metal or alkaline-earth metal like a salt; borax, sodium nitrate, and alkali.

From the viewpoint of reducing the scratches and particles and from the viewpoint of enhancing productivity of a polishing composition, it is preferable in the diatomite that the average pore diameter as measured by a mercury intrusion method is 0.1 to 3.5 µm, more preferably 0.1 to 3.4 µm, still more preferably 0.2 to 3.3 µm, still further preferably 0.2 to 3.2 µm, still further preferably 1.0 to 3.2 µm, and still further preferably 2.0 to 3.2 µm. In the present invention, the term "average pore diameter as measured by a mercury intrusion method" refers to an average value of a pore diameter based on a volume of a filter-aid particle and can be measured by a method described in the examples.

A BET specific surface area of the diatomite is preferably 3.5 m$^2$/g or more, more preferably 4.0 m$^2$/g or more, and still more preferably 4.1 m$^2$/g or more, from the viewpoint of reducing scratches and particles and from the viewpoint of enhancing productivity of a polishing composition. Further, the specific surface area is preferably 1000.0 m$^2$/g or less, more preferably 100.0 m$^2$/g or less, still more preferably 50.0 m$^2$/g or less, and still further preferably 25.0 m$^2$/g or less, from the viewpoint of enhancing productivity of a polishing composition. Therefore, the specific surface area is preferably 3.5 to 1000.0 m$^2$/g, more preferably 3.5 to 100.0 m$^2$/g, further more preferably 3.5 to 50.0 m$^2$/g, still further preferably 4.0 to 50.0 m$^2$/g, still further preferably 4.1 to 50.0 m$^2$/g, and still further preferably 4.1 to 25.0 m$^2$/g, from the viewpoint of reducing scratches and particles and from the viewpoint of enhancing productivity of a polishing composition. The BET specific surface area of the diatomite can be obtained by the method described in the examples.

A laser average particle diameter of the diatomite is preferably 1 to 30 µm, more preferably 1 to 20 µm, still more preferably 1 to 18 µm, still further preferably 1 to 16 µm, still further preferably 1 to 15 µm, still further preferably 5 to 15 µm, and still further preferably 10 to 15 µm, from the viewpoint of reducing scratches and particles and from the viewpoint of enhancing productivity of a polishing composition. Herein the laser average particle diameter of the diatomite refers to an average particle diameter of diatomite particles measured by a laser type particle size distribution measurement apparatus and can be measured by the method described in the examples.

An integrated pore volume of 0.15 µm or less by a nitrogen adsorption method of the diatomite is preferably 0.3 mL/g or more, more preferably 0.35 mL/g or more, and still more preferably 0.4 mL/g or more, from the viewpoint of reducing scratches and particles and from the viewpoint of enhancing productivity of a polishing composition. The integrated pore volume is preferably 100 mL/g or less, more preferably 50 mL/g or less, still more preferably 10 mL/g or less, still further preferably 1 mL/g or less, and still further preferably 0.8 mL/g or less, from the viewpoint of enhancing productivity of a polishing composition. Therefore, the integrated pore volume is preferably 0.3 to 100 mL/g, more preferably 0.35 to 50 mL/g, still more preferably 0.4 to 10 mL/g, still further preferably 0.4 to 1 mL/g, and still further preferably 0.4 to 0.8 mL/g, from the viewpoint of reducing scratches and particles and from the viewpoint of enhancing productivity of a polishing composition. Herein, the integrated pore volume of 0.15 μm or less by the nitrogen adsorption method of the diatomite refers to a total of pore volumes of 0.15 μm or less in a pore distribution of a volume standard of the diatomite by the nitrogen adsorption method and can be obtained specifically by the method described in the examples.

[Polyvalent Amine Compound]

The polyvalent amine compound used for treating the diatomite in the cationization treatment is a polyvalent amine compound having 9 to 200 cationic groups in the molecule.

Examples of the cationic groups include a primary amine (—NH$_2$), a secondary amine (—NH—), a tertiary amine (>N—), and a quaternary ammonium (>N$^+$<). Preferably the cationic group is a primary amine (—NH$_2$), a secondary amine (—NH—) and/or a tertiary amine (>N—) from the viewpoint of applying the diatomite with appropriate charging characteristics and removing efficiently the sediments thereby reducing scratches and particles.

The number of the cationic groups in the polyvalent amine compound is 9 or more, preferably 10 or more, more preferably 11 or more, still more preferably 12 or more, still further preferably 20 or more, and still further preferably 40 or more, from the viewpoint of applying the diatomite with appropriate charging characteristics and removing efficiently the coarse particles and the sediments thereby reducing the scratches and particles, from the viewpoint of enhancing productivity of a polishing composition, and from the viewpoint of preventing a polyvalent amine compound from excessively adsorbing to degrade a filtration efficiency. From the similar viewpoints, the number is 200 or less, preferably 150 or less, more preferably 100 or less, still more preferably 100 or less, still further preferably 60 or less, and still further preferably 50 or less. Therefore, the number of the cationic groups in the polyvalent amine compound is 9 to 200, preferably 10 to 150, more preferably 11 to 100, still more preferably 12 to 60, still further preferably 20 to 50, and still further preferably 40 to 50, from the viewpoint of applying the diatomite with appropriate charging characteristics and removing efficiently coarse particles and sediments thereby reducing scratches and particles, from the viewpoint of enhancing productivity of a polishing composition, and from the viewpoint of preventing a polyvalent amine compound from excessively adsorbing to degrade a filtration efficiency. The number of the cationic groups is an average value, and in a case of a polymer compound, it can be calculated by dividing the number average molecular weight with a molecular weight of monomer, for example.

For the polyvalent amine compound, a polymer compound having an amino group (polyamine compound) is preferred. Specific examples of the polyvalent amine compounds include polyalkyleneimine, polydiallylamine, polydiallyl dialkyl ammonium salt, polyallylamine, and polyvinylamine. In particular, polyalkyleneimine and polyallylamine are preferred, and polyalkyleneimine is more preferred, from the viewpoint of applying the diatomite with appropriate charging characteristics and removing efficiently coarse particles and sediments thereby reducing scratches and particles. Examples of the polyalkyleneimine include polyethyleneimine, polypropyleneimine, and polybutadieneimine. From the similar viewpoints, polyethyleneimine is preferred.

The number average molecular weight of the polyvalent amine compound (e.g., polyalkyleneimine and polyallylamine) is preferably 400 or more, more preferably 450 or more, still more preferably 500 or more, still further preferably 550 or more, still further preferably 1000 or more, and still further preferably 1500 or more, from the viewpoint of applying the diatomite with appropriate charging characteristics and removing efficiently coarse particles and sediments thereby reducing scratches and particles, from the viewpoint of enhancing productivity of a polishing composition, and from the viewpoint of preventing a polyvalent amine compound from excessively adsorbing to degrade a filtration efficiency. From the similar viewpoints, the number average molecular weight is preferably 9000 or less, more preferably 8000 or less, still more preferably 6000 or less, still further preferably 4000 or less, still further preferably 3000 or less, and still further preferably 2500 or less. Therefore, the number average molecular weight of the polyvalent amine compound (e.g., polyalkyleneimine and polyallylamine) is preferably 400 to 9000, more preferably 400 to 8000, still more preferably 450 to 6000, still further preferably 500 to 4000, still further preferably 550 to 3000, still further preferably 550 to 2500, still further preferably 1000 to 2500, and still further preferably 1500 to 2500, from the viewpoint of applying the diatomite with appropriate charging characteristics and removing efficiently coarse particles and sediments thereby reducing scratches and particles, and from the viewpoint of enhancing productivity of a polishing composition. The number average molecular weight of the polyvalent amine compound is a value measured on the basis of ebullioscopy, and it can be obtained by the method described below.

Among the number average molecular weights of the polyvalent amine compounds, for example, the number average molecular weight of the polyalkyleneimine can be calculated in the following manner for example. A dilute solution is prepared by dissolving the polyalkyleneimine in a solvent such as water that can dissolve the polyalkyleneimine. The boiling point of the prepared dilute solution is measured to obtain the elevation of boiling point Δθ from a pure solvent. Using the obtained Δθ, a number average molecular weight M is calculated from the equation below.

$$M = K(1000 w_2)/\Delta\theta w_1$$

Here, $w_1$ is the mass of the used solvent, $w_2$ is the mass of dissolved polyalkyleneimine, and K is the molar ebullioscopic constant of the solvent. In a case of water, K is 0.515. In a case of using any other solvent, for example, "*Kagakubinran* (Handbook of Chemistry)", Basic II, 4$^{th}$ edition (edited by The Chemical Society of Japan; published by Maruzen, 1993) is referred to.

[Diatomite-Containing Filter]

The diatomite-containing filter to be used in the above-mentioned filtration treatment (1) is not limited particularly as long as it includes the diatomite that has been cationized (hereinafter this is described also as "cationized diatomite") on a surface of the filter and/or in the interior of the filter. A filter aperture is preferably 1/10 or less, more preferably 1/20 or less, and still more preferably 1/30 or less of an average particle diameter of the cationized diatomite, from the viewpoint of reducing scratches and particles. In the above-mentioned filtration treatment (1), body feeding may be combined further with pre-coating of the diatomite.

The aperture of the diatomite-containing filter is preferably 10 μm or less, more preferably 5 μm or less, still more preferably 3 μm or less, still further preferably 2 μm or less, and still further preferably 1 μm or less, from the viewpoint of preventing leakage of diatomite from a filter and from the viewpoint of enhancing a filtration precision. Further, the aperture is preferably 0.1 μm or more, more preferably 0.2 μm or more, still more preferably 0.3 μm or more, and still further preferably 0.5 μm or more, from the viewpoint of enhancing a filter liquid passing speed. Therefore, the aperture is preferably 0.1 to 10 µm, more preferably 0.2 to 5 µm, still more preferably 0.3 to 3 µm, still further preferably 0.5 to 2 µm, and still further preferably 0.5 to 1 µm.

A content ($g/cm^2$) of the diatomite or the cationized diatomite in the diatomite-containing filter is expressed with the weight of the cationized diatomite ($g/cm^2$) per effective filtration area of the filter. The content is preferably 0.001 $g/cm^2$ or more, more preferably 0.005 $g/cm^2$ or more, still more preferably 0.01 $g/cm^2$ or more, still further preferably 0.02 $g/cm^2$ or more, and still further preferably 0.04 $g/cm^2$ or more, still further preferably 0.05 $g/cm^2$ or more, and still further preferably 0.1 $g/cm^2$ or more, from the viewpoint of reducing scratches and particles and from the viewpoint of enhancing productivity of a polishing composition. The content is preferably 1 $g/cm^2$ or less, more preferably 0.8 $g/cm^2$ or less, still more preferably 0.6 $g/cm^2$ or less, still further preferably 0.4 $g/cm^2$ or less, and still further preferably 0.2 $g/cm^2$ or less, from the viewpoint of enhancing a filtration speed. Therefore, the content of the diatomite or cationized diatomite is preferably 0.001 to 1 $g/cm^2$, more preferably 0.005 to 0.8 $g/cm^2$, still more preferably 0.01 to 0.6 $g/cm^2$, still further preferably 0.02 to 0.4 $g/cm^2$, still further preferably 0.04 to 0.2 $g/cm^2$, still further preferably 0.05 to 0.2 $g/cm^2$, and still further preferably 0.1 to 0.2 $g/cm^2$, from the viewpoint of reducing scratches and particles, from the viewpoint of enhancing productivity of a polishing composition, and from the viewpoint of enhancing a filtration speed.

It is preferable that the filter aid in the diatomite-containing filter includes the cationized diatomite and substantially it is composed of cationized diatomite. Further the diatomite-containing filter may contain a filter aid other than the cationized diatomite, and it may contain a substance other than the cationized diatomite in a range not to degrade the effect of the present invention.

Examples of the filter aid other than the diatomite include perlite, cellulose, and activated carbon. Cellulose and perlite are preferred from the viewpoint of preventing leakage of diatomite from a filter.

Examples of a filter material for the diatomite-containing filter include: filter paper; plastics such as polyethylene, polypropylene, polyether sulphone, cellulose acetate, nylon, polycarbonate, and Teflon (registered trademark); ceramics; and metal mesh. From the viewpoint of reducing scratches and particles, filter paper and plastics are preferred. Filter paper, polyethylene, polypropylene, polyether sulphone, cellulose acetate and nylon are more preferred; filter paper, polyethylene and polypropylene are further preferred; and filter paper is still further preferred.

Though a shape of the diatomite-containing filter is not particularly limited, from the viewpoint of ease of handling and reduction of scratches and particles, a sheet type, a cylinder type, a disc type, and a folded type are preferred; a sheet type, a disc type, and a folded type are more preferred; and a disc type and a folded type are further preferred.

[Raw Silica Particle Dispersion]

The raw silica particle dispersion to be filtered with the diatomite-containing filter in the filtration treatment (1) is a silica particle dispersion containing colloidal silica whose primary particles have an average particle diameter in a range of 1 to 100 nm.

The average particle diameter of the primary particles of the colloidal silica in the raw silica particle dispersion is 1 to 100 nm, preferably 1 to 50 nm, more preferably 5 to 50 nm, still more preferably 10 to 50 nm, still further preferably 18 to 50 nm, and still further preferably 18 to 30 nm, from the viewpoint of reducing scratches and from the viewpoint of reducing particles. The average particle diameter is preferably 1 to 50 nm, more preferably 3 to 50 nm, still more preferably 5 to 40 nm, still further preferably 5 to 30 nm, and still further preferably 10 to 30 nm, from the viewpoint of enhancing a polishing speed. Here, the average particle diameter of the primary particles of the colloidal silica is a value measured by the method as described in the examples below.

A content of the colloidal silica in the raw silica particle dispersion is preferably 1 to 50 wt %, more preferably 10 to 45 wt %, still more preferably 10 to 40 wt %, still further preferably 20 to 40 wt %, and still further preferably 30 to 40 wt %, from the viewpoint of reducing scratches and particles and from the viewpoint of enhancing productivity.

From the viewpoint of suppressing formation of coarse particles and enhancing stability of colloidal silica, the pH of the raw silica particle dispersion is preferably 9 to 11, more preferably 9.2 to 10.8, still more preferably 9.4 to 10.6, and still further preferably 9.5 to 10.5. The pH of the raw silica particle dispersion can be regulated with a well-known pH regulator. Examples of preferred pH regulators include sodium hydroxide, potassium hydroxide, ammonia, and tetramethyl ammonium hydroxide.

The colloidal silica in the raw silica particle dispersion can be obtained by, for example, a production method of generating colloidal silica from silicic acid aqueous solution. Further, these polishing particles whose surface is modified or reformed with a functional group, the polishing particles formed into composite particles with a surfactant or another abradant, and the like can be used.

In an embodiment, the raw silica particle dispersion can be composed substantially of colloidal silica and water. Examples of water to be used include ion-exchange water, distilled water, and ultrapure water. In the present embodiment, a polishing composition can be obtained by adding an additional component (described later) that can be compounded in the polishing composition, to the silica particle composition that is obtained after the filtration treatment (1). And in another embodiment, the raw silica particle dispersion may include all or a part of the other components that can be compounded in the polishing composition. In a case where the raw silica particle dispersion includes all of the other components that can be compounded in the polishing composition, the filtrate obtained in the filtration treatment (1) can be used directly as a polishing composition or the concentrate.

[Embodiment of Filtration Treatment (1)]

There is no particular limitation on the conditions for filtration of the raw silica particle dispersion by use of the diatomite-containing filter in the filtration treatment (1). However, from the viewpoint of satisfying both enhancement of filtration precision and enhancement of productivity, differential pressure at a time of filtration is preferably 0.01 to 10 MPa, more preferably 0.05 to 1 MPa, still more preferably 0.05 to 0.5 MPa, and still further preferably 0.05 to 0.2 MPa. The number of stages of the diatomite-containing filter is preferably 1 to 5, more preferably 1 to 3, and still more preferably 1 to 2, from the viewpoint of satisfying both enhancement of filtration precision and enhancement of productivity. A filtration speed is preferably 0.1 to 30 $L/(min \cdot m^2)$, more preferably 0.5 to 20 $L/(min \cdot m^2)$, still more preferably 1 to 10 $L/(min \cdot m^2)$, and still further preferably 1 to 5 $L/(min \cdot m^2)$, from the viewpoint of satisfying both enhancement of filtration precision and enhancement of productivity In the filtration treatment (1), as one embodiment, it is preferred to use a depth filter and a pleats filter by further combining them, which have been conventionally used for producing a polishing composition, from the viewpoint of reducing scratches and particles.

As a method of the filtration treatment (1), a circulating system in which filtration is performed repeatedly or a one pass system may be used. Alternatively, a batch system in which the one pass system is repeated may be used. As a liquid passing method, for applying pressure, a pump is preferably used in the circulating system, and in the one pass system, a pressure filtration method in which a variation width of a filter inlet pressure is reduced by introducing an air pressure of the like into a tank, as well as a pump, can be used.

In the filtration treatment (1), in addition to the use of the depth filter and the pleats filter, a general dispersion process or particle removal step may be provided. For example, a dispersion step using a high-speed dispersion device or a high-pressure dispersion device such as a high-pressure homogenizer and a precipitation process using a centrifugal device or the like also can be used. In the case of treating particles by use of these devices, each treatment may be performed alone or a combined treatment of at least two kinds may be performed. There is no particular limitation on a combined treatment order. Further, a treatment condition and a treatment number also can be selected and used appropriately.

[Polishing Composition]

The production method of the present invention includes preferably production of a polishing composition by use of silica particles that have been subjected to the filtration treatment (1). In one embodiment, the polishing composition that is or can be produced by the production method of the present invention (hereinafter it may be described also as "polishing composition of the present invention") may include colloidal silica and water and furthermore below-mentioned acids or the salts thereof or alkali and/or an oxidizing agent. However, it should be noted that the polishing composition of the present invention is not limited to the compositions but can include other components.

[Content of Colloidal Silica]

From the viewpoint of enhancing a polishing speed, the content of colloidal silica in a polishing composition for polishing an object according to the present invention is preferably 0.5 wt % or more, more preferably 1 wt % or more, still more preferably 3 wt % or more, and still further preferably 5 wt % or more. From the viewpoint of enhancing surface quality economically, the same content is preferably 20 wt % or less, more preferably 15 wt % or less, still more preferably 13 wt % or less, still further preferably 10 wt % or less, and still further preferably 7 wt % or less. Therefore, from the viewpoint of enhancing a polishing speed and enhancing surface quality economically, the same content is preferably 0.5 to 20 wt %, more preferably 1 to 15 wt %, still more preferably 3 to 13 wt %, still further preferably 5 to 10 wt %, and still further preferably 5 to 7 wt %.

[Water]

Examples of water to be used in the polishing composition of the present invention include ion exchange water, distilled water, and ultrapure water. The content of the water in the polishing composition corresponds to a remaining portion obtained by removing a abradant and other components from 100 wt %, and it is preferably 60 to 99 wt %, more preferably 80 to 97 wt %.

[pH]

Though the pH of the polishing composition of the present invention may be adjusted appropriately in accordance with the object to be polished, in a case of application to polishing, the pH is preferably 0.1 to 7.0. Scratches tend to occur in an alkaline state, compared with an acidic state. Although the occurrence mechanism thereof is not clear, it is presumed that, in an alkaline atmosphere in which polishing particles react strongly with each other due to surface charge, an aggregate of polishing primary particles or coarse polishing primary particles contained in the polishing composition cannot perform dense filling in a polishing portion and are subject to load under a polishing pressure easily. The pH is preferably determined depending upon the kind of an object to be polished and required characteristics. When the material for an object to be polished is a metal material, from the viewpoint of enhancing a polishing speed, the pH of the polishing composition is preferably 6.0 or less, more preferably 5.0 or less, still more preferably 4.0 or less, still further preferably 3.0 or less, and still further preferably 2.0 or less. From the viewpoint of reducing influence on a human body and from the viewpoint of preventing corrosion of a polishing device, the pH is preferably 0.5 or more, more preferably 1.0 or more, and still more preferably 1.2 or more. In a substrate for a precision component in which a material for an object to be polished is a metal material, such as an aluminum alloy substrate plated with nickel-phosphorus (Ni—P), the pH is preferably 0.5 to 6.0, more preferably 1.0 to 5.0, still more preferably 1.2 to 4.0, still further preferably 1.2 to 3.0, and still further preferably 1.2 to 2.0, from the viewpoint of enhancing a polishing speed, from the viewpoint of reducing influence on a human body and from the viewpoint of preventing corrosion of a polishing device.

[Acids, Alkalis]

The polishing composition of the present invention may include an acid or the salt thereof, or an alkali, from the viewpoint of enhancing a polishing speed. Specific examples of the acids and the salts thereof include inorganic acids such as nitric acid, sulfuric acid, nitrous acid, persulfuric acid, hydrochloric acid, perchloric acid, phosphoric acid, phosphonic acid, phosphinic acid, pyrophosphoric acid, tripolyphosphoric acid, and amidosulfonic acid, or salts thereof, organic phosphonic acids such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, α-methylphosphonosuccinic acid, or salts thereof amino carboxylic acids such as glutamic acid, picolinic acid, and aspartic acid, or salts thereof, and carboxylic acids such as oxalic acid, nitrosuccinic acid, maleic acid, and oxaloacetic acid, or salts thereof. From the viewpoint of reducing scratches, preferably the polishing composition of the present invention includes inorganic acids or organic phosphonic acids and salts thereof.

Of the above-mentioned inorganic acids or salts thereof, nitric acid, sulfuric acid, hydrochloric acid, perchloric acid, or salts thereof are more preferred. Of the above-mentioned organic phosphonic acids or salts thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), or salts thereof are more preferred. These acids or salts may be used alone or in combination of at least two kinds.

There is no particular limitation on the salts of the above-mentioned acids, and specific examples thereof include salts of metal, ammonia, and alkylamine. Specific examples of the metal include those belonging to Groups 1A, 1B, 2A, 2B, 3A, 3B, 4A, 6A, 7A, or 8 in the periodic table (long form). From the viewpoint of reducing scratches, metals belonging to ammonia or Group 1A are preferred.

The contents of the acid and the salt in the polishing composition of the present invention is preferably 0.001 to 5 wt %, more preferably 0.01 to 4 wt %, still more preferably 0.05 to 3 wt %, still further preferably 0.1 to 2.0 wt %, and still further preferably 0.1 to 1.0 wt %, from the viewpoint of enhancing a polishing speed, and from the viewpoint of reducing scratches and particles on a substrate surface after polishing.

[Oxidizing Agent]

It is preferred that the polishing composition of the present invention contains an oxidizing agent, from the viewpoint of enhancing a polishing speed. Examples of the oxidizing agent that can be used in the polishing composition of the present invention include a peroxide, permanganic acid or a salt thereof, chromic acid or a salt thereof, peroxoacid or a salt thereof, oxygen acid or a salt thereof, metal salts, nitric acids, and sulfuric acids, from the viewpoint of enhancing a polishing speed.

Examples of the peroxide include a hydrogen peroxide, sodium peroxide, and barium peroxide. An example of permanganic acid or a salt thereof is potassium permanganate. Examples of chromic acid or a salt thereof include a chromic acid metal salt and a dichromic acid metal salt. Examples of peroxoacid or a salt thereof include peroxodisulfuric acid, ammonium peroxydisulfate, a peroxodisulfuric acid metal salt, peroxophosphoric acid, peroxosulfuric acid, sodium peroxoborate, performic acid, peracetic acid, perbenzoic acid, and perphthalic acid. Examples of oxygen acid or a salt thereof include hypochlorous acid, hypobromous acid, hypoiodous acid, chloric acid, bromic acid, iodic acid, sodium hypochlorite, and calcium hypochlorite. Examples of the metal salts include iron (III) chloride, iron (III) sulfate, iron (III) nitrate, iron (III) citrate, and ammonium iron (III) sulfate.

Examples of a preferred oxidizing agent include hydrogen peroxide, iron (III) nitrate, peracetic acid, ammonium peroxydisulfate, iron (III) sulfate, and ammonium iron (III) sulfate. A more preferred oxidizing agent is hydrogen peroxide, from the viewpoint of being used for general purposes without metal ions adhering to a surface and being inexpensive. These oxidizing agents may be used alone or in combination of at least two kinds.

The content of the oxidizing agent in the polishing composition is preferably 0.01 wt % or more, more preferably 0.05 wt % or more, and still more preferably 0.1 wt % or more, from the viewpoint of enhancing a polishing speed, and the content is preferably 4 wt % or less, more preferably 2 wt % or less, and still more preferably 1 wt % or less, from the viewpoint of reducing surface roughness of a substrate. Therefore, in order to enhance a polishing speed while maintaining surface quality, the content is preferably 0.01 to 4 wt %, more preferably 0.05 to 2 wt %, and still more preferably 0.1 to 1 wt %.

[Other Components]

Further, other components may be compounded in the polishing composition, if required. Examples of the other components include a thickener, a dispersing agent, a rust-preventive agent, a basic component, and a surfactant.

The 0.45 μm filter liquid passing quantity of the polishing composition of the present invention is preferably 25 mL or more, more preferably 30 mL or more, still more preferably 50 mL or more, still further preferably 100 mL or more, still further preferably 200 mL or more, still further preferably 300 mL or more, and still further preferably 400 mL or more, from the viewpoint of reducing scratches and particles. Herein, the 0.45 μm filter liquid passing quantity of the polishing composition can be measured by the method described in the examples.

The content of coarse particles in the polishing composition of the present invention is preferably $0.5 \times 10^4$ to $10 \times 10^4$ pieces/mL, more preferably $0.5 \times 10^4$ to $5 \times 10^4$ pieces/mL, still more preferably $0.5 \times 10^4$ to $4 \times 10^4$ pieces/mL, and still further preferably $0.5 \times 10^4$ to $3 \times 10^4$ pieces/mL, from the viewpoint of reducing scratches. Herein, the content of the coarse particles in the polishing composition is measured by the method described in the examples.

Further, the ΔCV value of the polishing composition of the present invention is preferably 0.1 to 10%, more preferably 0.1 to 5%, still more preferably 0.1 to 4%, still further preferably 0.1 to 3%, still further preferably 0.1 to 2%, and still further preferably 0.5 to 2%, from the viewpoint of reducing scratches and particles and from the viewpoint of enhancing productivity. There is a correlation between the ΔCV value of a polishing composition and the content of colloidal silica aggregate (non-spherical particles) considered to be derived from coarse particles and sediment. Therefore, it is considered that, by adjusting the ΔCV value of the polishing composition in the above-mentioned predetermined range, scratches and particles after polishing can be reduced.

Herein, the ΔCV value of the polishing composition in the present Specification is a difference (ΔCV=CV30−CV90) between a value (CV30) of a variable coefficient obtained by dividing a standard deviation by an average particle diameter and multiplying the result by 100, obtained by measurement based on a scattering intensity distribution at a detection angle of 30° (forward scattering) by dynamic light scattering method, and a value (CV90) of a variable coefficient obtained by dividing a standard deviation by an average particle diameter and multiplying the result by 100, obtained by measurement based on a scattering intensity distribution at a detection angle of 90° (lateral scattering), with regard to the silica particle dispersion used for the polishing composition. Specifically, the ΔCV value can be measured by the method described in the examples.

Dynamic light scattering, in principle, can provide substantially constant results with regard to scattering intensity distributions regardless of the detection angle, when a spherical particle dispersion solution containing particles of 200 nm or less is measured, and the measurement results therefore are not dependent on the detection angle. However, due to the presence of non-spherical particles, the scattering intensity distribution obtained by dynamic light scattering of a spherical particle dispersion solution containing non-spherical particles significantly varies depending on the detection angle; the lower the detection angle, the broader the scattering intensity distribution. Consequently, the measurement results with regard to the scattering intensity distributions obtained by dynamic light scattering are dependent on the detection angle, and it is believed that a trace amount of non-spherical particles present in a spherical particle dispersion solution can be measured by measuring a ΔCV value, which is one of the indices for the "angular dependence of a scattering intensity distribution measured by dynamic light scattering". However, the present invention is not limited to these mechanisms.

There are three particle size distributions (scattering intensity; volume conversion; and number conversion) of submicron-level or smaller particles obtained by the Dynamic Light Scattering (DLS) method or a Quasielastic Light Scattering (QLS) method in the present Specification. Regarding the scattering intensity distribution, JP 2010-170650 A can be referred to.

[Polishing Method]

The polishing composition obtained by the production method of the present invention is supplied, for example, between organic polymer based polishing cloth (polishing pad) or the like of nonwoven fabric and a substrate to be polished, that is, the polishing composition is supplied to a substrate surface to be polished sandwiched by polishing boards with polishing pads attached thereto, and the polishing boards and/or the substrate are moved under a predetermined pressure, whereby the polishing composition is used in the polishing step while being in contact with the substrate. This polishing can remarkably suppress the occurrence of scratches and particles. Therefore, in another aspect, the present invention relates to a method of polishing a substrate. Namely, the present invention relates to a method of polishing a substrate, which includes steps of supplying a polishing composition of the present invention onto the surface to be polished of the substrate to be polished, contacting a polishing pad to the surface to be polished, and polishing by moving the polishing pad and/or the substrate to be polished.

[Method for Producing Substrate]

The polishing composition of the present invention is particularly preferred for production of a substrate for a precision component. The polishing composition is suitable for polishing substrates of magnetic recording media such as a magnetic disk and a magnetooptical disk; and substrates for a precision component such as an optical disk, a photomask substrate, an optical lens, an optical mirror, an optical prism, and a semiconductor substrate. For producing a semiconductor substrate, the polishing composition obtained by the production method of the present invention can be used in the step of polishing a silicon wafer (bare wafer), the step of forming a buried element separation film, the step of flattening an interlayer insulating film, the step of forming buried metal wiring, and the step of forming a buried capacitor.

Although the polishing composition of the present invention is particularly effective in the polishing step, the polishing composition also can be applied similarly to, for example, other polishing steps such as a wrapping step.

Examples of a preferred material for an object to be polished, using the polishing composition of the present invention, include metals or semi-metals such as silicon, aluminum, nickel, tungsten, copper, tantalum, and titanium, or alloys thereof glass materials such as glass, glass carbon, and amorphous carbon; ceramic materials such as alumina, silicon dioxide, silicon nitride, tantalum nitride, and titanium carbide; and resins such as a polyimide resin. Of those, objects to be polished containing metals such as aluminum, nickel, tungsten, and copper, and objects to be polished containing alloys that contain these metals as main components are preferred. For example, an aluminum alloy substrate plated with Ni—P, and glass substrates such as crystallized glass and amorphous glass are more preferred, and an aluminum alloy substrate plated with Ni—P is further preferred.

There is no particular limitation on the shape of the object to be polished, and the polishing composition of the present invention is used in, for example, those which have a flat portion such as a disc shape, a plate shape, a slab shape, and a prism shape; and those which have a curved portion such as a lens. Of those, the polishing composition of the present invention is excellent in polishing a disc-shaped object to be polished.

In the case where a production of a substrate includes a plurality of polishing steps, it is preferred to use the polishing composition obtained by the production method of the present invention in the second and subsequent steps, and from the viewpoint of obtaining excellent surface smoothness with scratches and particles remarkably reduced, it is more preferred to use the polishing composition in a finish-polishing step. The finish-polishing step refers to at least one last polishing step in the case where there is a plurality of polishing steps.

In this case, in order to prevent contamination of an abradant in the previous step and the polishing composition, separate polishing machines may be used respectively. Further, in the case where separate polishing machines are used respectively, it is preferred that a substrate be cleaned in each step. There is no particular limitation on the polishing machine. A substrate thus produced has excellent surface smoothness, in which scratches and particles are remarkably reduced. That is, the surface roughness (AFM-Ra) after polishing is, for example, 0.1 nm or less, preferably 0.09 nm or less, and more preferably 0.08 nm or less.

Further, the produced substrate has very few scratches and particles. Thus, in the case where the substrate is, for example, a memory hard disk substrate, the substrate also can handle a recording density of 750 GB/Disk (3.5 inch), further 1 TB/Disk (3.5 inch).

EXAMPLES

1. [Raw Silica Dispersion]

As the raw silica dispersion, colloidal silica dispersions A-C in Table 1 were used. The average particle diameter of primary particles, the $\Delta CV$ value, the quantity of coarse particles, and the 0.45 μm filter liquid passing quantity of the colloidal silica were measured in the following manner.

TABLE 1

| Colloidal silica dispersion | Manufacturer | Average particle diameter of primary particles (nm) | Silica particle content (wt %) | Number of coarse particles (pieces/mL) | $\Delta CV$ value (%) | 0.45 μm filter liquid passing quantity (mL) |
|---|---|---|---|---|---|---|
| A | JGC Catalysts & Chemicals Co., Ltd. | 20 | 40 | 257088 | 10.3 | 17.0 |
| B | Nissan Chemical Industries Co., Ltd. | 15 | 30 | 1182922 | 10.2 | 4.0 |
| C | Nissan Chemical Industries Co., Ltd. | 45 | 20 | 508562 | 9.8 | 28.0 |

[Method for Measuring Average Particle Diameter of Primary Particles of Colloidal Silica]

First, 1.5 g (solid content) each of the colloidal silica dispersions was collected in a 200 mL beaker, and 100 mL of ion exchange water was added thereto, followed by mixing with a stirrer. Next, the pH of the sample solution was adjusted to 3.0 with a 0.1 mol/L of hydrochloric acid standard solution through use of a potentiometric titrator. Sodium chloride (30.0 g) was added to the resultant sample solution and dissolved therein with a stirrer. Ion exchange water was added to the sample solution up to a 150 mL reference line of the beaker, followed by mixing with a stirrer. The beaker was soaked in a constant temperature water tank (20±2° C.) for about 30 minutes. The sample solution was titrated with a 0.1 mol/L sodium hydroxide standard solution through use of the potentiometric titrator, and a consumption amount (g) (A) of the sodium hydroxide standard solution when the pH changed from 4.0 to 9.0 was read. Simultaneously, a blank test was performed, and a consumption amount (g) (B) of the sodium hydroxide standard solution required for titration in the blank test is read. Then, an average particle diameter (nm) is calculated by the following calculation expression.

Average particle diameter(nm)=3100÷26.5× $(A-B)$÷collected amount of sample$(g)$

[Method for Measuring ΔCV Value]

A measurement sample was prepared by adding a colloidal silica dispersion before (or after) being filtered with a filter-aid containing filter to an aqueous solution in which sulfuric acid (super-high grade manufactured by Wako Pure Chemical Industries, Ltd.), HEDP (1-hydroxyethylidene-1,1-diphosphonic acid, manufactured by Thermos Japan), and a hydrogen peroxide solution (concentration: 35 wt %, manufactured by Asahi Denka Kogyo Co. Ltd.) were diluted with ion exchange water, and mixing the resultant solution, followed by filtering the solution with a 1.20 μm filter (Minisart 17593, manufactured by Sartorius Stedim Japan K.K.). The contents of the colloidal silica, sulfuric acid, HEDP, and hydrogen peroxide solution were respectively 5 wt %, 0.4 wt %, 0.1 wt %, and 0.4 wt %. Then, 20 mL of the obtained measurement sample was placed in a dedicated 21φ cylindrical cell, and set in a dynamic light scattering device (DLS-6500) manufactured by Otsuka Electronics Co., Ltd. A particle diameter at which an area of a scattering intensity distribution obtained by a Cumulant method at a detection angle of 90° when integrated 200 times became 50% of the entire area was obtained in accordance with an instruction manual attached to the device. Further, a CV value (CV90) of colloidal silica at a detection angle of 90° was calculated as a value obtained by dividing a standard deviation in the scattering intensity distribution measured in accordance with the above-mentioned measurement method by the particle diameter and multiplying the obtained value by 100. In the same way as in the measurement method of the CV90, a CV value (CV30) of colloidal silica at a detection angle of 30° was measured, and the CV90 was subtracted from the CV30 to obtain a ΔCV value of a silica particle. It is considered that a smaller ΔCV value indicates a smaller amount of sediments.

(Condition for Measurement of DLS-6500)
Detection Angle: 90°
Sampling Time 4 (μm)
Correlation Channel: 256 (ch)
Correlation Method: TI
Sampling Temperature: 26.0 (° C.)
Detection Angle: 30°
Sampling Time: 10 (μm)
Correlation Channel: 1024 (ch)
Correlation Method: TI
Sampling Temperature: 26.0 (° C.)

[Method for Measuring Amount of Coarse Particles]

A colloidal silica dispersion before (or after) being filtered with a filter-aid containing filter was injected into the following measurement unit with a 6 mL syringe, whereby a measurement sample was measured for the amount of coarse particles.
Measurement unit: "AccuSizer 780 APS" manufactured by Particle Sizing Systems Inc.
Injection Loop Volume: 1 mL
Flow Rate: 60 mL/min.
Data Collection Time: 60 sec.
Number of Channels: 128

[Method for Measuring a Filter Liquid Passing Quantity]

A colloidal silica dispersion before (or after) being filtered with a filter-aid containing filter was passed through a predetermined filter (hydrophilic PTFE 0.45 filter, type: 25HP045AN, manufactured by Advantec Co., Ltd.) under a predetermined pressure (air pressure: 0.30 MPa), whereby a measurement sample was measured for a liquid passing quantity until the filter was blocked up. It is considered that a larger amount of 0.45 μm filter passing liquid indicates the smaller number of coarse particles.

2. [Filter-aid Containing Filter]

Filter-aid containing filters were produced by using the filter aids a to e as described below and indicated in Table 2 after cationizing or without cationizing the filter aids, and then the raw silica dispersion was filtered under the conditions described below. The laser average particle diameter, the BET specific surface area, the average pore diameter and the integrated pore volume of not more than 0.15 μm of each filter aid were measured in the following manner. And the filter-aid containing filter was produced in the following manner.

[Filter Aid]
a: Radiolight No. 300 (diatomite: manufactured by Showa Chemical Industry Co., Ltd.)
b: Rokahelp 4109 (perlite: manufactured by Mitsui Kinzoku Kougyou Inc.)
c: ARBOCEL BE600/10TG (cellulose: manufactured by TOAKASEI CO., LTD.)
d: Celpure P65 (diatomaceous earth: manufactured by SIGMA-ALDRICH Corp.)
e: Celite 500 fine (diatomaceous earth: manufactured by SIGMA-ALDRICH Corp.)

TABLE 2

| Filter aid | | Laser average particle diameter | BET specific surface area | Average pore diameter | Integrated pore volume |
|---|---|---|---|---|---|
| ID | Material | μm | m$^2$/g | μm | mL/g |
| a | Diatomite | 14.5 | 4.1 | 3.1 | 0.41 |
| b | Perlite | 25.2 | 2.2 | — | — |
| c | Cellulose | 19.1 | 1.4 | — | — |
| d | Diatomite | 12.7 | 19.7 | 2.3 | 0.6 |
| e | Diatomite | 15.0 | 20.3 | 2.4 | 0.6 |

[Method for Measuring Laser Average Particle Diameter of Filter Aid]

A value obtained as a volume-based median diameter obtained by measuring each filter aid with a laser scattering particle size distribution analyzer (trade name: LA-920, manufactured by Horiba Ltd.) was defined as a laser average particle diameter.

[Method for Measuring BET Specific Surface Area of Filter Aid]

About 1 g of each precisely weighed filter aid was set in ASAP2020 (Specific surface area·Pore distribution measurement device, manufactured by Shimadzu Corporation), and a BET specific surface area was measured by a multi-point method to derive a value in a range in which a BET constant C became positive. The pretreatment of a sample was performed by raising the temperature of the sample by 10° C./min and holding the sample at 60° C. so as to degas to 500

μmHg at 60° C. It was further held at 500 μmHg and the temperature was raised by 10° C./min up to 100° C. and held for 2 hours.

[Method for Measuring Average Pore Diameter of Filter Aid]

About 0.2 g of each filter aid was precisely weighed, and a sample was placed in a 5 cc measurement cell for powder, and the cell was set in AutoPore IV-9500 (mercury intrusion method, pore distribution measurement device, manufactured by Shimadzu Corporation). Next, an application (AutoPore IV-9500 ver1.07) was started up with a personal computer, and requirements were input to Sample Information (weight of a filter aid measured in advance), Analysis Condition (select w), Penetrometer Property (cell weight), and Report condition (select Standard), whereby measurement was performed under the below-mentioned conditions. Measurement was performed in the order of a low-pressure portion and a high-pressure portion, and automatically, results of a Log Differential Pore Volume (mL/g) with respect to Median pore diameter (Volume) (μm) and each Pore Size Diameter (μm) were obtained. A median pore diameter (volume) was defined as an average pore diameter (μm) of a filter aid.

(Measurement Condition)

Measurement Cell: 5 cc-Powder (08-0444), manufactured by Micromeritics Instrument Corporation Measurement System Pressure control system (pressure table mode)

Low pressure Equilibrium time: 5 secs

High pressure Equilibrium time: 5 secs

Parameters regarding Hg: contact angle: 130°, surface tension: 485 dynes/cm

Stem Volume Used: sample amount is adjusted to be equal to or less than 100% (about 50%)

[Method for Measuring Integrated Pore Volume of 0.15 μm or Less]

An integrated pore volume of 0.15 μm or less of a filter aid was measured by a nitrogen adsorption method. Specifically, about 1 g of each precisely weighed filter aid was set in ASAP2020 (Specific surface area·Pore distribution measurement device, manufactured by Shimadzu Corporation), and a total pore diameter of 0.15 μm or less obtained by a Halsey system of a BJH method from a nitrogen adsorption isotherm was defined as an integrated power volume of 0.15 μm or less. The pretreatment of a sample was performed by raising the temperature of the sample by 10° C./min and holding the sample at 100° C. for 2 hours. Further, the sample was degassed up to 500 μmHg at 60° C.

[Production of Filter-aid Containing Filter]

To 200 g of ion exchange water, 10 g of each of the filter aids a-e was added, followed by stirring and mixing with a magnetic stirrer so as to obtain an aqueous dispersion of the filter aid. Next, filter paper (No. 5A, manufactured by Advantec Co., Ltd.) was set in a 90 mmφ plate-type SUS housing (INLET 90-TL, manufactured by Sumitomo 3M Ltd.), and the aqueous dispersion of the filter aid was filtered under a pressure of 0.1 MPa or less to form a uniform cake layer of the filter aid on the filter paper. After that, the cake layer was washed with 1 to 2 L of ion exchange water so as to form a filter-aid cake layer (pre-coat layer), thereby a filter was formed.

[Cationization Treatment and Production of Cationized Filter-aid Containing Filter]

To 200 g of 1 wt % (in terms of effective component) aqueous solution of the polyvalent cation compound (polyvalent amine compound as indicated in Table 3 below) was added, followed by stirring and mixing with a magnetic stirrer so as to obtain an aqueous dispersion of the filter aid. Next, filter paper (No. 5A: manufactured by Advantec Co., Ltd.) was set in a 90 mmφ plate-type SUS housing (INLET 90-TL, manufactured by Sumitomo 3M Ltd.), and the aqueous dispersion of filter aid was filtered under a pressure of 0.1 MPa or less to form a uniform cake layer of the filter aid on the filter paper. After that, the cake layer was washed with 1 to 2 L of ion exchange water to form a cationized filter-aid cake layer (pre-coat layer), thereby a filter was formed.

[Method of Measuring Zeta Potential of Filter Aid]

The filter-aid cake layer and the filter-aid cake layer obtained by the cationization treatment were dispersed in the ion exchange water so as to prepare a 2 wt % filter-aid aqueous dispersion. The pH of the 2 wt % filter-aid aqueous dispersion was adjusted to 10 by use of an aqueous solution of sodium hydroxide or hydrochloric acid, and measured with an instrumentation for measurement of zeta potential (Zeta Probe, manufactured by Colloidal Dynamics LLC). In measurement of the zeta potential by using the Zeta Probe, measurement was carried out at least three times for the same sample, and the average was set to the zeta potential.

3. [Filtration Treatment]

[Condition for Filtration of Colloidal Silica]

Each of the colloidal silica dispersions A-C was filtered with the thus produced filter-aid containing filter which remained wet with washing water without being dried under a pressure of 0.1 MPa, pH 10 at 1 L/(min·m$^2$) to obtain filtered colloidal silica dispersions to be used in polishing compositions (Examples 1-8, Comparative Examples 1-5 and Reference Examples 1-7). As the liquid flowing out in the early stage of filtration is distilled with water in the filter, 100 mL of each of the colloidal silica dispersions was discarded. For these filtered colloidal silica dispersions (Examples 1-8, Comparative Examples 1-5 and Reference Examples 1-7), the 0.45 μm filter liquid passing quantity and the ΔCV value were measured under the above-mentioned conditions. Measurement results of the 0.45 μm filter liquid passing quantity and the ΔCV value in Examples 1-4, Comparative Example 1 and Reference Examples 1-7 are indicated in Table 3 below. Further, measurement results of the 0.45 μm filter liquid passing quantity and the improvement rate in the filter liquid passing quantity (Example including cationization treatment/Comparative Example not including cationization treatment) in Examples 2, 5-8 and Comparative Examples 1-5 are indicated in Table 4 below.

4. [Preparation of Polishing Composition]

To 1733 g of ion exchange water, 8 g of sulfuric acid in terms of effective component, 1 g of 1-hydroxyethylidene-1,1-diphosphonic acid in terms of effective component, and 8 g of hydrogen peroxide in terms of effective component were added and mixed. While stirring the thus obtained aqueous solution, 250 g of a colloidal silica dispersion (100 g in terms of effective component) that had been filtered with a filter-aid containing filter was added to the aqueous solution, thereby preparing the polishing composition for Examples 1-8, Comparative Examples 1-5 and Reference Examples 1-7 (pH 1.3). The concentrations of the respective components of the obtained polishing composition are: 0.4 wt % for sulfonic acid, 0.05 wt % for 1-hydroxyethylidene-1,1-diphosphonic acid, 0.4 wt % for hydrogen peroxide, and 5.0 wt % for colloidal silica.

5. [Polishing of Substrate by Use of Polishing Composition]

Substrates to be polished were polished by using the polishing compositions prepared by the production methods of Examples 1-4, Comparative Example 1 and Reference Examples 1-7 as described above and the number of scratches and particles on the substrates for evaluation were evaluated. Table 3 shows the evaluation results for Examples 1-4, Comparative Example 1 and Reference Examples 1-7. As the substrate to be polished, an aluminum alloy substrate plated with Ni—P having an AFM-Ra of 5 to 15 Å, a thickness of 1.27 mm, an outer diameter of 95 mmφ, and an inner diameter of 25 mmφ, roughly polished with a polishing liquid containing an alumina abradant in advance, was used. Polishing conditions and methods for measuring the scratches and particles are described below.

[Polishing Condition]
Polishing test machine: double-sided 9B polisher, manufactured by SpeedFam Co., Ltd.
Polishing pad: urethane-finished polishing pad, manufactured by Fujibo Holdings, Inc.
Number of revolutions of an upper surface plate: 32.5 r/min
Polishing composition supply amount: 100 mL/min
Main polishing time: 4 minutes
Main polishing load: 7.8 kPa (4) Spin rinse
(5) Spin dry

[Condition for Measuring Scratches]
Measurement equipment: Candela OSA6100, manufactured by KLA-Tencor Corporation
Evaluation: Of the substrates placed in a polishing test machine, four substrates were selected at random, and each substrate was irradiated with a laser at 10,000 rpm and measured for scratches. The total number of scratches (lines) on both surfaces of the respective four substrates was divided by 8 to calculate the number of scratches per substrate surface.

[Condition for Measuring Particles]
Measurement equipment: Candela OSA6100, manufactured by KLA-Tencor Corporation
Evaluation: Of the substrates placed in a polishing test machine, four substrates were selected at random. The total number of particles (pieces) on both surfaces of the respective four substrates was divided by 8 to calculate the number of particles per substrate surface.

TABLE 3

| (Table 3) | Colloidal silica dispersion | Filter aid | Polyvalent amine compound | | | Zeta potential after cationization treatment (mV) (pH10) | 0.45 μm filter liquid passing quantity after filtration treatment (mL) | ΔCV value after filtration treatment (%) | Polishing evaluation | |
|---|---|---|---|---|---|---|---|---|---|---|
| | | | Type | Number of cationic groups | Molecular weight | | | | Scratches lines/surface | Particles pieces/surface |
| Ex. 1 | A | a | Polyethyleneimine | 14 | 600 | 0 | 393 | 1.5 | 34 | 278 |
| Ex. 2 | A | a | Polyethyleneimine | 42 | 1800 | 20 | 510 | 0.7 | 29 | 242 |
| Ex. 3 | A | a | Polyallylamine | 53 | 3000 | 20 | 375 | 1.5 | 38 | 312 |
| Ex. 4 | A | a | Polyallylamine | 140 | 8000 | 25 | 275 | 1.8 | 42 | 344 |
| Co. 1 | A | a | No treatment | | | −40 | 230 | 2.0 | 48 | 370 |
| Re. 1 | A | a | Pentaethylene hexamine | 6 | 232 | −40 | 143 | 2.7 | 66 | 477 |
| Re. 2 | A | a | Polyethyleneimine | 7 | 300 | 0 | 108 | 3.7 | 79 | 553 |
| Re. 3 | A | a | Polyethyleneimine | 232 | 10000 | 20 | 148 | 5.5 | 64 | 468 |
| Re. 4 | A | a | Polyethyleneimine | 1625 | 70000 | 20 | 193 | 1.9 | 54 | 406 |
| Re. 5 | A | a | Polyaluminum chloride | 0 | 175~2485 | −45 | 57 | 7.2 | 120 | 782 |
| Re. 6 | A | b | Polyethyleneimine | 42 | 1800 | 20 | 34 | 7.2 | 167 | 1025 |
| Re. 7 | A | c | Polyethyleneimine | 42 | 1800 | −10 | 29 | 9.1 | 187 | 1126 |

*Ex.: Example;
Co.: Comparative Example;
Re.: Reference Example

Number of placed substrates: 10

[Cleaning Condition]
The polished substrate was cleaned with a Sub substrate cleaning machine produced by Hikari Co., Ltd. in the following steps so as to provide a substrate for evaluation.
(1) US (ultrasonic) soak cleaning (950 kHz)
(2) Scrub cleaning: three-tier sponge brush
(3) US shower cleaning (950 kHz)

As shown in the above Table 3, in the filtered colloidal silica dispersions to be used for polishing compositions obtained in Examples 1-4, the 0.45 μm filter passing liquid quantities are increased remarkably in comparison with the filtered colloidal silica dispersions obtained in Comparative Example 1 and Reference Examples 1-7. It is also shown that polishing compositions using these filtered colloidal silica dispersions are capable of effectively reducing scratches and particles.

TABLE 4

| (Table 4) | Colloidal silica dispersion | Filter aid | Polyvalent amine compound | | | Zeta potential after cationization treatment (mV)(pH10) | 0.45 μm filter passing quantity after filtration treatment (mL) | Improvement rate of filter passing liquid quantity (x) |
|---|---|---|---|---|---|---|---|---|
| | | | Type | Number of cationic groups | Molecular weight | | | |
| Ex. 2 | A | a | Polyehtyleneimine | 42 | 1800 | 20 | 510 | 2.2 |
| Co. 1 | A | a | No cationization treatment | | | −40 | 230 | |
| Ex. 5 | B | a | Polyehtyleneimine | 42 | 1800 | 20 | 82 | 3.6 |
| Co. 2 | B | a | No cationization treatment | | | −40 | 23 | |
| Ex. 6 | C | a | Polyehtyleneimine | 42 | 1800 | 20 | 233 | 3.5 |

TABLE 4-continued

| (Table 4) | Colloidal silica dispersion | Filter aid | Polyvalent amine compound | | | Zeta potential after cationization treatment (mV)(pH10) | 0.45 μm filter passing quantity after filtration treatment (mL) | Improvement rate of filter passing liquid quantity (x) |
|---|---|---|---|---|---|---|---|---|
| | | | Type | Number of cationic groups | Molecular weight | | | |
| Co. 3 | C | a | No cationization treatment | | | −40 | 66 | |
| Ex. 7 | A | d | Polyehtyleneimine | 42 | 1800 | 5 | 420 | 1.8 |
| Co. 4 | A | d | No cationization treatment | | | −45 | 239 | |
| Ex. 8 | A | e | Polyehtyleneimine | 42 | 1800 | 5 | 655 | 3.0 |
| Co. 5 | A | e | No cationization treatment | | | −20 | 221 | |

*Ex.: Example;
Co.: Comparative Example

As shown in Table 4 above, in each of the filtered dispersions of the colloidal silica dispersions A, B and C obtained in Examples 2, 5 and 6, the 0.45 μm filter liquid passing quantity was increased remarkably in comparison with the filtered colloidal silica dispersions obtained in Comparative Examples 1, 2 and 3. The result indicates that the filtration precision can be enhanced by cationization treatment of the filter-aid containing filter with respect to the raw silica dispersion whose average particle diameters are different. It has been confirmed that both scratches and particles are reduced in a polishing composition using a filtered colloidal silica dispersion whose 0.45 μm filter liquid passing quantity has been increased.

Further, as shown in Table 4 above, in each of the filtered colloidal silica dispersions obtained in Examples 7 and 8, the 0.45 μm filter liquid passing quantity was increased remarkably in comparison with the filtered colloidal silica dispersions obtained in Comparative Examples 4 and 5. The result indicates that the filtration precision can be enhanced by cationization treatment of the filter-aid containing filter with respect to the filter aids (diatomite) having different physical properties. It has been confirmed that both scratches and particles are reduced in a polishing composition using a filtered colloidal silica dispersion whose 0.45 μm filter liquid passing quantity has been increased.

Industrial Applicability

A polishing composition produced by the production method of the present invention can be used for a step of polishing a precision component substrate for achieving high density or high integration, for example.

The present invention may relate to the aspects below.

<1> A method for producing a polishing composition, the method comprising a step of filtering with a filtration filter a silica particle dispersion containing colloidal silica whose primary particles have an average particle diameter in a range of 1 to 100 nm, wherein the filtration filter comprises diatomite cationized by use of a polyvalent amine compound having 9 to 200 cationic groups in the molecule.

<2> The method for producing a polishing composition according to <1>, wherein the number of the cationic groups in the polyvalent amine compound is 10 or more, preferably 11 or more, more preferably 12 or more, still more preferably 20 or more, and still further preferably 40 or more, and/or, 150 or less, preferably 100 or less, more preferably 100 or less, still more preferably 60 or less, and still further preferably 50 or less, and/or, 10 to 150, preferably 11 to 100, more preferably 12 to 60, still more preferably 20 to 50, and still further preferably 40 to 50.

<3> The method for producing a polishing composition according to <1> or <2>, wherein the polyvalent amine compound is a polymer compound having an amino group and preferably selected from the group consisting of polyalkyleneimine, polydiallylamine, polydiallyl dialkyl ammonium salt, polyallylamine, and polyvinylamine; more preferably polyalkyleneimine and polyallylamine; and still more preferably polyalkyleneimine.

<4> The method for producing a polishing composition according to <3>, wherein the polyalkyleneimine is polyethyleneimine, polypropyleneimine or polybutadieneimine; preferably, polyethyleneimine.

<5> The method for producing a polishing composition according to any one of <1> to <4>, wherein the polyvalent amine compound has a number average molecular weight in a range of 400 to 9000.

<6> The method for producing a polishing composition according to any one of <1> to <5>, wherein an average pore diameter of the diatomite obtained by a mercury intrusion method is 0.1 to 3.5 μm, preferably 0.1 to 3.4 μm, more preferably 0.2 to 3.3 μm, still more preferably 0.2 to 3.2 μm, still further preferably 1.0 to 3.2 μm, and still further preferably 2.0 to 3.2 μm.

<7> The method for producing a polishing composition according to any one of <1> to <6>, wherein an integrated pore volume of not larger than 0.15 μm of the diatomite obtained by a nitrogen adsorption method is 0.3 mL/g or more, preferably 0.35 mL/g or more, and more preferably 0.4 mL/g or more, and/or, 100 mL/g or less, preferably 50 mL/g or less, more preferably 10 mL/g or less, still more preferably 1 mL/g or less, and still further preferably 0.8 mL/g or less, and/or, 0.3 to 100 mL/g, preferably 0.35 to 50 mL/g, more preferably 0.4 to 10 mL/g, more preferably 0.4 to 1 mL/g, and still further preferably 0.4 to 0.8 mL/g.

<8> The method for producing a polishing composition according to any one of <1> to <7>, wherein the diatomite has a BET specific surface area of 3.5 m$^2$/g or more, preferably 4.0 m$^2$/g or more, and more preferably 4.1 m$^2$/g or more, and/or, 1000.0 m$^2$/g or less, preferably 100.0 m$^2$/g or less, more preferably 50.0 m$^2$/g or less, and still more preferably 25.0 m$^2$/g or less, and/or, 3.5 to 1000.0 m$^2$/g, preferably 3.5 to 100.0 m$^2$/g, more preferably 3.5 to 50.0 m$^2$/g, still more preferably 4.0 to 50.0 m$^2$/g, still further preferably 4.1 to 50.0 m$^2$/g, and still further preferably 4.1 to 25.0 m$^2$/g.

<9> The method for producing a polishing composition according to any one of <1> to <8>, comprising a step of producing a filtration filter comprising the cationized diatomite.

<10> The method for producing a polishing composition according to any one of <1> to <9>, wherein the concentration of the polyvalent amine compound in the aqueous solution of the polyvalent amine compound during the cationization treatment is 0.05 to 10.0 wt %, preferably 0.1 to 5.0 wt %, and more preferably 0.5 to 2.0 wt %.

<11> The method for producing a polishing composition according to any one of <1> to <10>, wherein the ratio in the amount of the polyvalent amine compound in use to the diatomite (weight ratio) is 1/500 to 1/1, preferably 1/200 to 1/2, more preferably 1/100 to 1/3, and still more preferably 1/10 to 1/4 as ('weight of polyvalent amine compound'/'weight of diatomite').

<12> The method for producing a polishing composition according to any one of <1> to <11>, wherein a content of the cationized diatomite in the filtration filter is 0.001 g/cm$^2$ or more, preferably 0.005 g/cm$^2$ or more, more preferably 0.01 g/cm$^2$ or more, still more preferably 0.02 g/cm$^2$ or more, still further preferably 0.04 g/cm$^2$ or more, still further preferably 0.05 g/cm$^2$ or more, and still further preferably 0.1 g/cm$^2$ or more, and/or, 1 g/cm$^2$ or less, preferably 0.8 g/cm$^2$ or less, more preferably 0.6 g/cm$^2$ or less, still more preferably 0.4 g/cm$^2$ or less, and still further preferably 0.2 g/cm$^2$ or less, and/or, 0.001 to 1 g/cm$^2$, preferably 0.005 to 0.8 g/cm$^2$, more preferably 0.01 to 0.6 g/cm$^2$, still more preferably 0.02 to 0.4 g/cm$^2$, still further preferably 0.04 to 0.2 g/cm$^2$, still further preferably 0.05 to 0.2 g/cm$^2$, and still further preferably 0.1 to 0.2 g/cm$^2$.

<13> The method for producing a polishing composition according to any one of <1> to <12>, wherein the average particle diameter of the primary particles of the colloidal silica in the silica particle dispersion is 1 to 50 nm, preferably 5 to 50 nm, more preferably 10 to 50 nm, still more preferably 18 to 50 nm, and still further preferably 18 to 30 nm.

<14> The method for producing a polishing composition according to any one of <1> to <13>, wherein a content of the colloidal silica in the silica particle dispersion is 1 to 50 wt %, preferably 10 to 45 wt %, more preferably 10 to 40 wt %, still more preferably 20 to 40 wt %, and still further preferably 30 to 40 wt %.

<15> The method for producing a polishing composition according to any one of <1> to <14>, wherein pH of the silica particle dispersion is 9 to 11, preferably 9.2 to 10.8, more preferably 9.4 to 10.6, and still more preferably 9.5 to 10.5.

<16> The method for producing a polishing composition according to any one of <1> to <15>, wherein a depth filter and/or a pleats filter are combined further and used with the filtration filter in the filtration treatment.

<17> A polishing composition produced by the production method according to any one of <1> to <16>.

<18> A filtration filter comprising diatomite cationized by use of a polyvalent amine compound having 9 to 200 cationic groups in the molecule.

<19> The filtration filter according to <18>, wherein the number of the cationic groups in the polyvalent amine compound is 10 or more, preferably 11 or more, more preferably 12 or more, still more preferably 20 or more, and still further preferably 40 or more, and/or, 150 or less, preferably 100 or less, more preferably 100 or less, still more preferably 60 or less, and still further preferably 50 or less, and/or, 10 to 150, preferably 11 to 100, more preferably 12 to 60, still more preferably 20 to 50, and still further preferably 40 to 50.

<20> The filtration filter according to <18> or <19>, wherein the polyvalent amine compound is a polymer compound having an amino group and preferably selected from the group consisting of polyalkyleneimine, polydiallylamine, polydiallyl dialkyl ammonium salt, polyallylamine, and polyvinylamine; more preferably polyalkyleneimine and polyallylamine; and still more preferably polyalkyleneimine.

<21> The filtration filter according to <20>, wherein the polyalkyleneimine is polyethyleneimine, polypropyleneimine or polybutadieneimine; preferably, polyethyleneimine.

<22> The filtration filter according to any one of <18> to <21>, wherein the polyvalent amine compound has a number average molecular weight in a range of 400 to 9000.

<23> The filtration filter according to any one of <18> to <22>, wherein an average pore diameter of the diatomite obtained by a mercury intrusion method is 0.1 to 3.5 μm, more preferably 0.1 to 3.4 μm, still more preferably 0.2 to 3.3 μm, still further preferably 0.2 to 3.2 μm, still further preferably 1.0 to 3.2 μm, and still further preferably 2.0 to 3.2 μm.

<24> The filtration filter according to any one of <18> to <23>, wherein an integrated pore volume of not larger than 0.15 μm of the diatomite obtained by a nitrogen adsorption method is 0.3 mL/g or more, preferably 0.35 mL/g or more, and more preferably 0.4 mL/g or more, and/or, 100 mL/g or less, preferably 50 mL/g or less, more preferably 10 mL/g or less, still more preferably 1 mL/g or less, and still further preferably 0.8 mL/g or less, and/or, 0.3 to 100 mL/g, preferably 0.35 to 50 mL/g, more preferably 0.4 to 10 mL/g, still more preferably 0.4 to 1 mL/g, and still further preferably 0.4 to 0.8 mL/g.

<25> The filtration filter according to any one of <18> to <24>, wherein the diatomite has a BET specific surface area of 3.5 m$^2$/g or more, preferably 4.0 m$^2$/g or more, and more preferably 4.1 m$^2$/g or more, and/or, 1000.0 m$^2$/g or less, preferably 100.0 m$^2$/g or less, more preferably 50.0 m$^2$/g or less, and still more preferably 25.0 m$^2$/g or less, and/or, 3.5 to 1000.0 m$^2$/g, preferably 3.5 to 100.0 m$^2$/g, more preferably 3.5 to 50.0 m$^2$/g, still more preferably 4.0 to 50.0 m$^2$/g, still further preferably 4.1 to 50.0 m$^2$/g, and still further preferably 4.1 to 25.0 m$^2$/g.

<26> The filtration filter according to any one of <18> to <25>, comprising a step of producing a filtration filter comprising the cationized diatomite.

<27> The filtration filter according to any one of <18> to <26>, wherein the concentration of the polyvalent amine compound in the aqueous solution of the polyvalent amine compound during the cationization treatment is 0.05 to 10.0 wt %, preferably 0.1 to 5.0 wt %, and more preferably 0.5 to 2.0 wt %.

<28> The filtration filter according to any one of <18> to <27>, wherein the ratio in the amount of the polyvalent amine compound in use to the diatomite (weight ratio) is 1/500 to 1/1, preferably 1/200 to 1/2, more preferably 1/100 to 1/3, and still more preferably 1/10 to 1/4 as ('weight of polyvalent amine compound' 'weight of diatomite').

<29> The filtration filter according to any one of <18> to <28>, wherein a content of the cationized diatomite in the filtration filter is 0.001 g/cm$^2$ or more, preferably 0.005 g/cm$^2$ or more, more preferably 0.01 g/cm$^2$ or more, still more preferably 0.02 g/cm$^2$ or more, still further preferably 0.04 g/cm$^2$ or more, still further preferably 0.05 g/cm² or more, and still further preferably 0.1 g/cm² or more, and/or, 1 g/cm² or less, preferably 0.8 g/cm² or less, more preferably 0.6 g/cm² or less, still more preferably 0.4 g/cm² or less, and still further preferably 0.2 g/cm² or less, and/or, 0.001 to 1 g/cm², preferably 0.005 to 0.8 g/cm², more preferably 0.01 to 0.6 g/cm², still more preferably 0.02 to 0.4 g/cm², still further preferably 0.04 to 0.2 g/cm², still further preferably 0.05 to 0.2 g/cm², and still further preferably 0.1 to 0.2 g/cm².

The invention claimed is:

1. A method for producing a polishing composition, the method comprising a step of filtering with a filtration filter a silica particle dispersion containing colloidal silica whose primary particles have an average particle diameter in a range of 1 to 100 nm,
wherein the filtration filter comprises diatomite cationized by use of a polyvalent amine compound having 9 to 200 cationic groups in the molecule.

2. The method for producing a polishing composition according to claim 1, wherein the polyvalent amine compound is polyalkyleneimine.

3. The method for producing a polishing composition according to claim 1, wherein the polyvalent amine compound has a number average molecular weight in a range of 400 to 9000.

4. The method for producing a polishing composition according to claim 1, wherein an integrated pore volume of not larger than 0.15 μm of the diatomite obtained by a nitrogen adsorption method is not less than 0.3 mL/g.

5. The method for producing a polishing composition according to claim 1, wherein the diatomite has a BET specific surface area of not less than 4.0 m²/g.

6. The method for producing a polishing composition according to claim 1, wherein in the cationization treatment, the ratio in the amount of the polyvalent amine compound in use to the diatomite (weight ratio) is 1/500 to 1/1 as ('weight of polyvalent amine compound' / 'weight of diatomite').

7. The method for producing a polishing composition according to claim 1, wherein a content of the cationized diatomite in the filtration filter is not less than 0.001 g/cm² and not more than 1 g/cm².

8. The method for producing a polishing composition according to claim 1, wherein a content of the colloidal silica in the silica particle dispersion is 1 to 50 wt %.

9. The method for producing a polishing composition according to claim 1, wherein the number of the cationic groups in the polyvalent amine compound is not less than 20 and not more than 100.

10. The method for producing a polishing composition according to claim 1, wherein the polyalkyleneimine is polyethyleneimine, polypropyleneimine, or polybutadieneimine.

11. The method for producing a polishing composition according to claim 1, wherein the pH of the silica particle dispersion is 9 to 11.

12. The method for producing a polishing composition according to claim 1, wherein in the filtration treatment, a depth filter and/or a pleats filter is used further in combination with the filtration filter.

* * * * *